United States Patent
Muglia et al.

(10) Patent No.: US 8,083,280 B2
(45) Date of Patent: Dec. 27, 2011

(54) MODULAR STORAGE COMPARTMENT FOR VEHICLE

(75) Inventors: John Muglia, Shelby Township, MI (US); Jeffrey Robbins, Ann Arbor, MI (US); Brian Buda, Brighton, MI (US); Bradley R. Hamlin, Canton, MI (US)

(73) Assignee: Magna International Inc., Aurora (CA)

( * ) Notice: Subject to any disclaimer, the term of this patent is extended or adjusted under 35 U.S.C. 154(b) by 59 days.

(21) Appl. No.: 12/389,141

(22) Filed: Feb. 19, 2009

(65) Prior Publication Data

US 2009/0218839 A1   Sep. 3, 2009

Related U.S. Application Data

(60) Provisional application No. 61/064,176, filed on Feb. 20, 2008.

(51) Int. Cl.
*B60J 7/00* (2006.01)
(52) U.S. Cl. .................. 296/37.1; 296/178
(58) Field of Classification Search .............. 296/178, 296/37.1, 37.6
See application file for complete search history.

(56) References Cited

U.S. PATENT DOCUMENTS

| | | | | |
|---|---|---|---|---|
| 2,189,139 A * | 2/1940 | Fox | ............... | 280/785 |
| 2,849,254 A * | 8/1958 | Dolk | ............... | 296/178 |
| 3,400,969 A * | 9/1968 | Ahrens | ............... | 296/178 |
| 3,989,119 A * | 11/1976 | Cady | ............... | 180/89.1 |
| 4,049,312 A * | 9/1977 | Rudbeck | ............... | 296/178 |
| 4,216,927 A | 8/1980 | Byrd | | |
| 4,666,204 A * | 5/1987 | Reinholtz | ............... | 296/22 |
| 4,728,144 A * | 3/1988 | Crean | ............... | 296/168 |
| 4,746,164 A * | 5/1988 | Crean | ............... | 296/164 |
| 4,772,063 A * | 9/1988 | Amy | ............... | 296/37.1 |
| 4,955,661 A * | 9/1990 | Mattice | ............... | 296/171 |
| 5,000,502 A * | 3/1991 | Lyall | ............... | 296/186.4 |
| 5,056,848 A * | 10/1991 | Fekete et al. | ............... | 296/63 |
| 5,129,597 A | 7/1992 | Manthey et al. | | |
| 5,244,269 A | 9/1993 | Harriehausen et al. | | |
| 5,383,628 A | 1/1995 | Harriehausen et al. | | |
| 5,403,063 A * | 4/1995 | Sjostedt et al. | ............... | 296/193.07 |
| 5,441,326 A | 8/1995 | Mikalonis | | |
| 5,501,504 A * | 3/1996 | Kunz | ............... | 296/164 |
| 5,820,076 A | 10/1998 | Schumacher et al. | | |
| 5,839,694 A | 11/1998 | Bargull et al. | | |
| 5,863,070 A * | 1/1999 | Williams et al. | ............... | 280/781 |
| 5,921,615 A * | 7/1999 | Gimenez | ............... | 296/164 |
| 6,099,070 A * | 8/2000 | Yocum | ............... | 296/182.1 |
| 6,318,671 B1 | 11/2001 | Schumacher et al. | | |
| 6,322,105 B1 * | 11/2001 | Na | ............... | 280/781 |
| 6,484,969 B2 | 11/2002 | Sprenger et al. | | |
| 6,685,254 B2 * | 2/2004 | Emmons et al. | ............... | 296/178 |
| 6,830,417 B2 * | 12/2004 | Deets | ............... | 410/4 |
| 6,857,603 B2 | 2/2005 | Lau et al. | | |
| 6,886,781 B2 | 5/2005 | Lau et al. | | |

(Continued)

*Primary Examiner* — Joseph Pape
(74) *Attorney, Agent, or Firm* — Warn Partners, P.C.; Marc Luddy (57) ABSTRACT

A modular storage compartment assembly for a vehicle includes a plurality of storage compartments coupled together and arranged in a side-by-side configuration to form a modular assembly. Each storage compartment includes a plurality of frame members coupled together to form a frame structure for the storage compartment, a floor assembly comprising a plurality of floor members coupled together, and at least one door configured to allow access to the storage compartment. The plurality of storage compartments are configured for coupling to a vehicle. The frame members and the floor members are formed of a pultruded composite material that comprises a polymeric resin matrix and fiber reinforcements provided within the matrix.

27 Claims, 6 Drawing Sheets

U.S. PATENT DOCUMENTS

| | | | |
|---|---|---|---|
| 7,097,232 B2 * | 8/2006 | Beaudry et al. | 296/178 |
| 7,175,202 B2 * | 2/2007 | Budica | 280/781 |
| 7,249,794 B2 * | 7/2007 | Doyle | 296/37.1 |
| 7,340,832 B2 * | 3/2008 | Crean | 29/897.2 |

* cited by examiner

MODULAR STORAGE COMPARTMENT FOR VEHICLE

CROSS-REFERENCE TO RELATED PATENT APPLICATIONS

This application claims the benefit of and priority to U.S. Patent Application No. 61/064,176, filed Feb. 20, 2008, the entire disclosure of which is incorporated herein by reference.

BACKGROUND

The present application relates generally to the field of storage compartments (e.g., for baggage or luggage, etc.) for use in vehicles (e.g., mass transit vehicles such as buses). More specifically, the present application relates to a modular system of storage which is relatively simple to manufacture and that may be tailored to accommodate different vehicle parameters (e.g., length or width).

It is known to provide storage compartments for luggage and other items in vehicles such as mass transit vehicles (e.g., buses, planes, etc.). For example, buses may include one or more compartments that are accessible from the exterior of the bus, and which are typically positioned toward the lower portion of the bus between the front and rear wheels.

According to one known embodiment, such storage compartments are built into the framework of the bus. There are a number of issues associated with such conventional storage compartments, including the fact that the compartments are typically custom made for a particular application, requiring a new set of tooling for each different configuration. Another issue is the fact that the storage compartments are typically integrated into the frame of the vehicle and are made of relatively heavy and expensive materials such as steel and the like.

It would be advantageous to provide a modular storage system for use with vehicles such as mass transit vehicles. It would also be advantageous to provide a storage system that is relatively simple and inexpensive to manufacture. It would further be advantageous to provide a modular storage system that may be tailored to particular dimensions for a desired application without requiring new manufacturing equipment for each different application configuration. It would be desirable to provide a storage system that includes any one or more of these or other advantageous features as may be apparent from the description provided herein.

SUMMARY

An exemplary embodiment of the invention relates to a modular storage compartment assembly for a vehicle that includes a plurality of storage compartments coupled together and arranged in a side-by-side configuration to form a modular assembly. Each storage compartment includes a plurality of frame members coupled together to form a frame structure for the storage compartment, a floor assembly comprising a plurality of floor members coupled together, and at least one door configured to allow access to the storage compartment. The plurality of storage compartments are configured for coupling to a vehicle. The frame members and the floor members are formed of a pultruded composite material that comprises a polymeric resin matrix and fiber reinforcements provided within the matrix.

Another exemplary embodiment of the invention relates to a modular storage compartment assembly for a vehicle that includes a plurality of storage compartments coupled together, wherein each storage compartment comprises a floor assembly comprising a plurality of floor members mateably coupled together, a first door member configured to provide access to the storage compartment, and a frame structure comprising multiple members coupled together to form a substantially hexahedral frame structure. The floor members and first door member are coupled to the frame structure. The floor members, first door member, and frame structure are formed from composite materials that include a polymeric matrix material and at least one reinforcement material embedded in the polymeric matrix material.

Another exemplary embodiment of the invention relates to a storage assembly for a vehicle that includes a plurality of storage compartments coupled to a frame of a vehicle between wheels of the vehicle, the storage compartments coupled together and arranged in a side-by-side configuration to form a modular assembly, with each storage compartment comprising a plurality of frame members coupled together to form a frame structure for the storage compartment, a floor assembly comprising a plurality of floor members coupled together, and at least one door configured to allow access to the storage compartment. The plurality of storage compartments are configured for coupling to a vehicle. The frame members and the floor members are formed of a pultruded composite material that comprises a polymeric resin matrix and fiber reinforcements provided within the matrix.

DETAILED DESCRIPTION

According to an exemplary embodiment, a modular storage compartment assembly (e.g., a luggage or baggage compartment assembly) is described for use within a mass transport or transit vehicle (e.g., a bus). The storage compartment may be accessible from outside the vehicle, provides useful utility in modular storage that is geometrically flexible, and may be made to blend with the exterior of the vehicle to provide an aesthetic finish.

Figure 1:
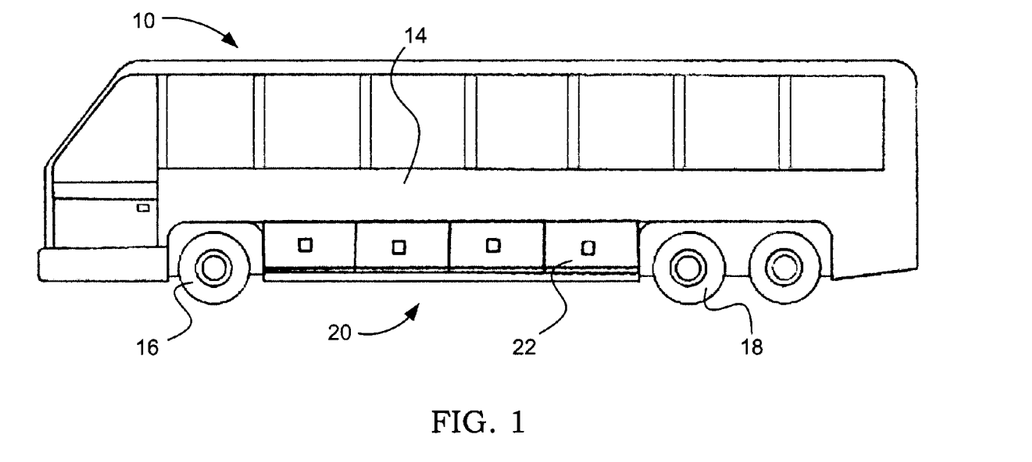
FIG. 1 is a side view of a mass transit vehicle (bus) including a modular storage compartment according to an exemplary embodiment.

Referring to FIG. 1, an exemplary embodiment of a mass transit vehicle 10 (e.g., a bus) is illustrated, and includes a passenger seating compartment 14, front wheels 16, at rear wheels 18, and a modular storage compartment assembly 20 (hereinafter referred to as assembly 20). It should be noted that although the present application describes the use of an assembly 20 in the context of a passenger bus, according to other exemplary embodiments, the assembly may be used with other types of vehicles as well (e.g., ambulances, fire trucks, semis, and other vehicles where storage compartments may be useful).

According to an exemplary embodiment, the assembly 20 may be configured to fit under the occupant seating compartment 14 and between the front and rear wheels 16, 18. According to other exemplary embodiments, a modular storage compartment assembly may be configured to fit within other areas of vehicle 10, such as rearward of the rear wheel 18, forward of front wheel 16, or in other useful areas.

According to an exemplary embodiment, the assembly 20 includes four individual compartments 22, as shown in FIG. 1, with each compartment 22 coupled to adjacent compartments 22 in a side-by-side configuration. The compartments 22 may be separated from each other by walls or may be open such that stowed materials may move between adjacent compartments (as shown, for example, in FIG. 2). According to other embodiments, a storage compartment assembly may include any desired number of compartments. Further, although shown in FIG. 1 as having substantially equal widths, the compartments may be provided with varying widths.

Figure 2:
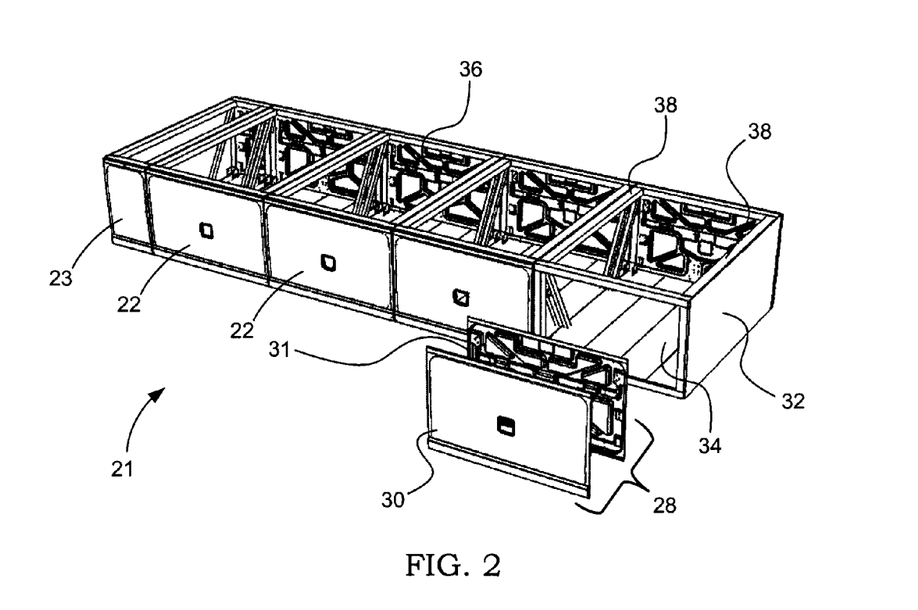
FIG. 2 is a perspective view of a modular storage compartment assembly according to an exemplary embodiment, with one of the doors exploded away.
Figure 3:
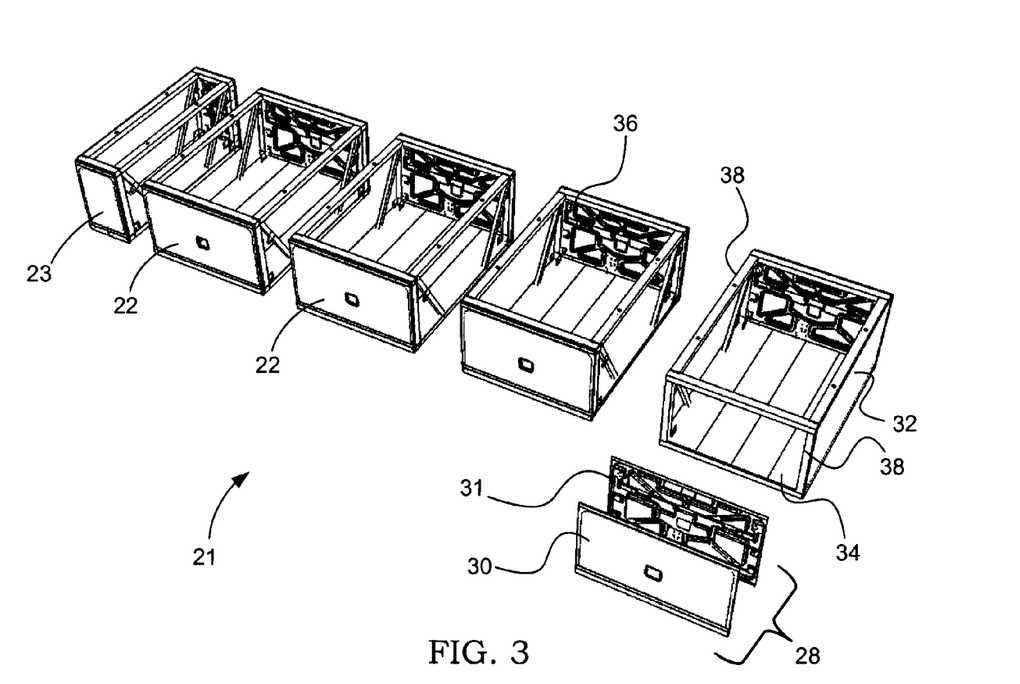
FIG. 3 is a partially exploded perspective view of the embodiment shown in FIG. 2, illustrating the individual baggage compartments uncoupled.

Referring to FIGS. 2 and 3, an assembly 21 similar to that described with respect to the assembly 20 for use within the vehicle 10 is shown according to an exemplary embodiment. The assembly 21 includes four compartments 22 of substantially equal size and one smaller compartment 23, all aligned substantially linearly in a side-by-side configuration, with each compartment 22, 23 coupled to an adjacent compartment. According to an exemplary embodiment, the compartments may be coupled together using fasteners or connectors (e.g., screws, bolts, rivets, adhesives, or any combination thereof).

This compartments 22, 23 are arranged such that a door assembly 28 of each of the compartments 22, 23 is facing the same direction and all doors are accessible from the same side of the vehicle 10. The design of the assembly 21 is flexible and may be constructed using any number of individual compartments 22, 23. For example, according to other embodiments, an assembly may be constructed with multiple compartments, each having varying dimensions (e.g., width) to accommodate customer driven specifications or requirements. The flexibility of the modular storage compartment assembly allows for it to be constructed into one assembly, as shown in FIG. 2, and installed as such into a vehicle, or, alternatively, the individual compartments may be installed individually into a vehicle, depending on customer needs.

Figure 13:
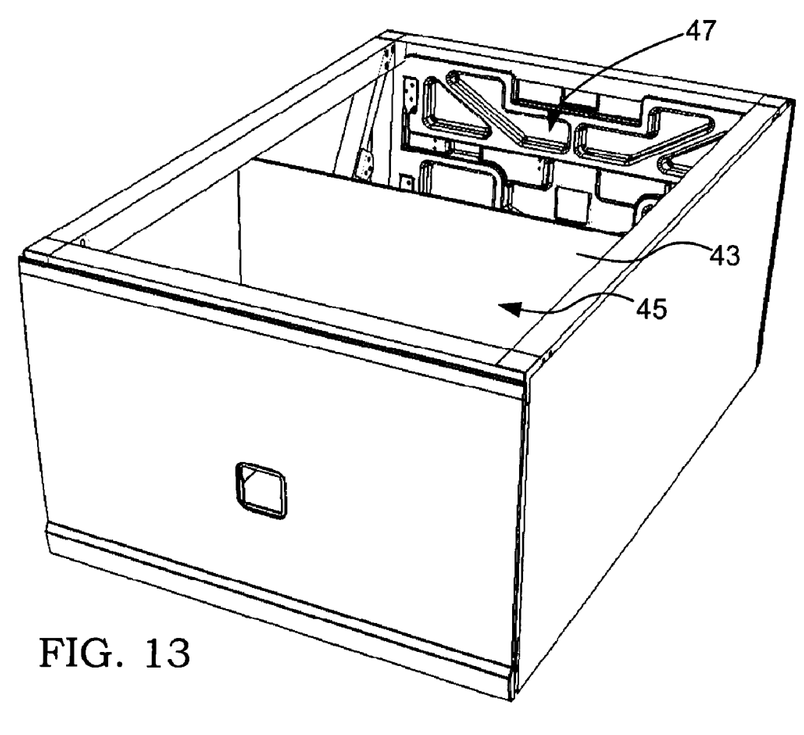
FIG. 13 is a perspective view of a compartment having a divider provided therein according to an exemplary embodiment.

According to an exemplary embodiment, the compartments 22, 23 have a depth that extends from one side of the vehicle 10 to the opposite side of the vehicle 10 (e.g., the storage compartment extends from the side shown in FIG. 1 to the opposite side of the vehicle), and the compartments may be accessible from one or both sides (e.g., doors may be provided on one or both sides of the compartment. According to another exemplary embodiment, an assembly may include two sets of storage compartments (e.g., such as those shown as assembly 21 in FIG. 2) arranged back-to-back such that each compartment has a depth that extends only partially across the width of the bus (in this embodiment, the back walls or frame members of the adjacent compartments may be coupled together for added stability or there may be a gap between them as may be desired). According to one exemplary embodiment in which two sets of compartments are arranged in a back-to-back configuration, a first set of door assemblies for the first set of compartments are accessible from one side of the vehicle, and a second set of door assemblies for the second set of compartments are accessible from the other side of the vehicle. According to yet another exemplary embodiment, a divider may be provided to separate a single compartment into two separate compartments, with each of the separate compartments accessible through doors provided on opposite sides of the vehicle (shown, e.g., in FIG. 13 as divider 43 positioned within a compartment 22 to effectively divide the compartment into two separate compartments 45, 47).

Figure 4:
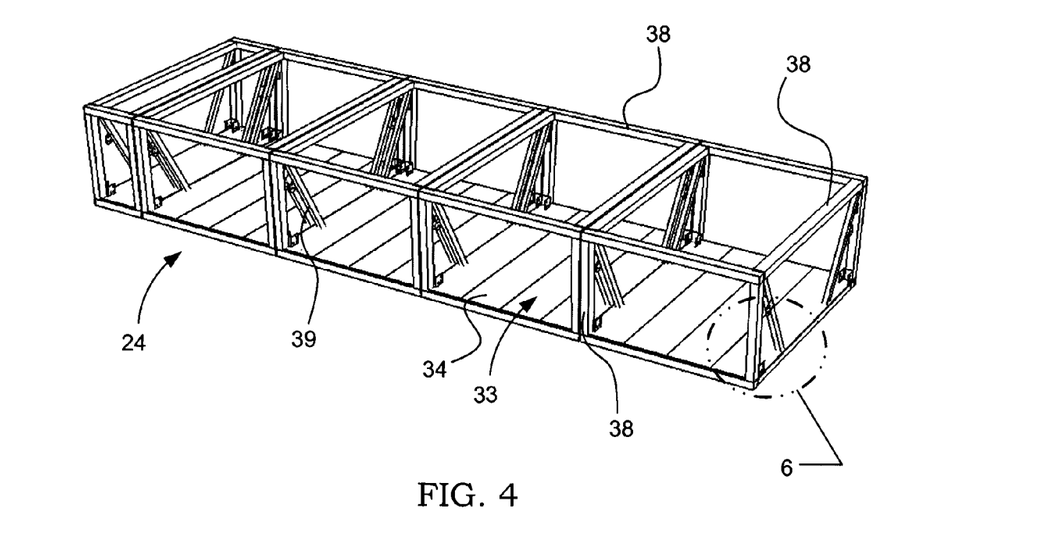
FIG. 4 is a perspective view of an exemplary embodiment of the frame structure for use within a modular baggage compartment assembly.
Figure 5:
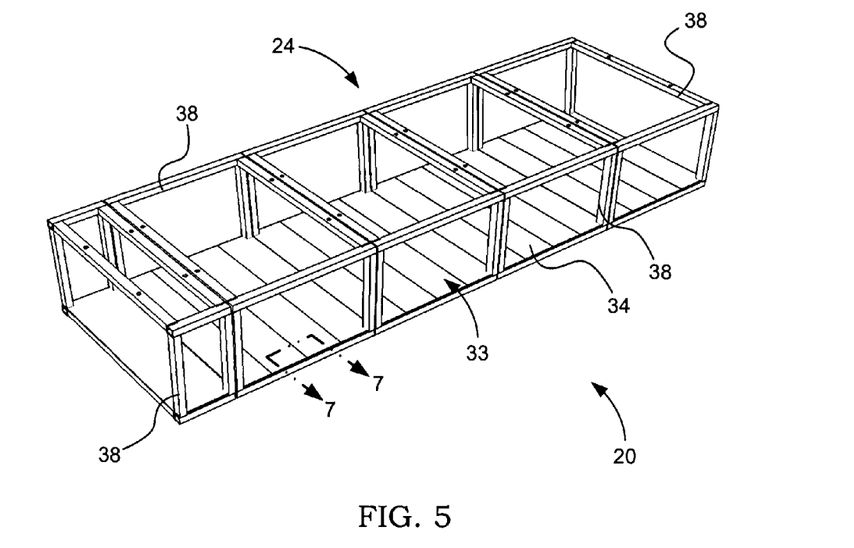
FIG. 5 is a perspective view of another exemplary embodiment of the frame structure for use within a modular baggage compartment assembly.

Referring to FIGS. 4 and 5, exemplary embodiments of frame structures 24 for use in constructing the assemblies 20, 21 are shown, although it should be understood that similar principles may be applied to assemblies according to other exemplary embodiments described herein. A frame structure 24 may be made from a plurality of reinforcement members 38, constructed to form a substantially hexahedral shape, whereby each face or surface of the hexahedron may have a substantially rectangular shape. According to an exemplary embodiment, the rectangular faces or surfaces of the hexahedral frame structure 24 may be constructed to have a box structure that includes reinforcement members 38, with the outer perimeter of the rectangular shape is structural, having a non-structural (e.g., hollow) center portion. According to another exemplary embodiment, the frame structure 24 may further include additional reinforcement members 39 that may run substantially diagonally to the reinforcement members 38 that form the box structure. These diagonal reinforcement members 39 coupled with the box structure reinforcement members 38 may form a truss structure, having improved strength, for higher load applications. According to another embodiment, the frame structure 24 may further include additional reinforcement members that may run substantially parallel or perpendicular to the box structure reinforcement members to provide greater strength for the structure.

Figures 6, 7:
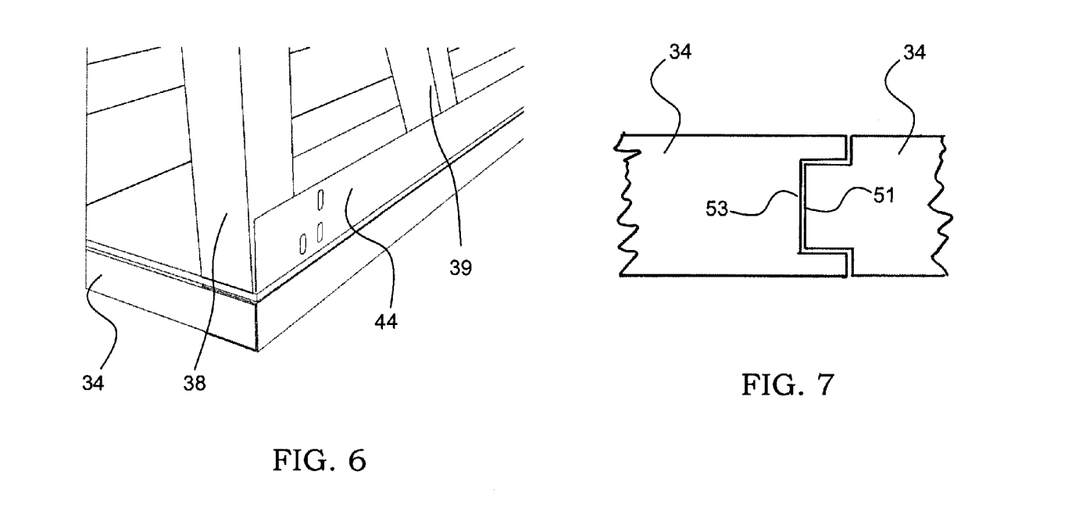
FIG. 6 is a detail view, taken from FIG. 4, illustrating an exemplary method of coupling the frame structure, using a coupling member.
FIG. 7 is a cross-sectional view taken across line 7-7 in FIG. 5, illustrating the coupling of two adjacent floor members.

Referring to FIG. 6, a detail view is shown illustrating an exemplary embodiment of an assembly 20, 21 that includes a coupling member 44. According to an exemplary embodiment, the coupling member 44 is made from a composite material, such as a resin reinforced by a fiber (e.g. a polyurethane reinforced by fiberglass), preferably manufactured through a pultrusion process; and may have a substantially rectangular shape with a thickness substantially thinner than its width or depth. The coupling member 44 may include apertures for coupling other members, such as two reinforcement members 38, 39 using fasteners (e.g., screws, rivets, bolts, adhesives, or any combination thereof).

Figure 8:
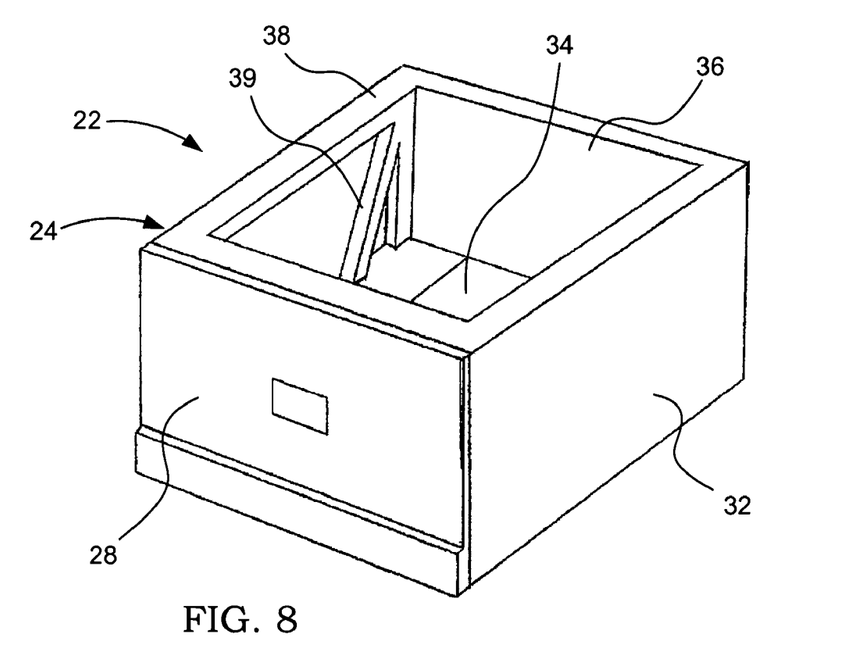
FIG. 8 is a perspective view of an exemplary embodiment of an individual baggage compartment.

Referring to FIG. 8, an exemplary embodiment of a compartment 22 is shown and may include a door assembly 28, at least one side member 32 (e.g., a wall or panel), a backing member 36 (e.g., a wall or panel), a floor assembly 33 formed from a plurality of floor members 34 (e.g., panels, sections, planks, etc.), and reinforcing members 38, 39. The frame structure 24 of an individual compartment 22 may be constructed by joining the reinforcement members 38 and floor members 34 through conventional coupling methods (e.g., fasteners and/or adhesives) to form a substantially hexahedral shape, as described above. The structural integrity of the frame structure 24 of an individual compartment 22 may be improved by including additional reinforcing members 39, as described above. The door assembly 28, the side member(s) or walls 32, and backing member 36 (which may alternatively be another door assembly) may then be coupled to the frame structure 24 using conventional coupling methods (e.g., fasteners and/or adhesives). The backing member 36 may be provided in the form of a wall (e.g., for an embodiment in which the compartment 22 may be accessed only from one side of the vehicle).

Figure 9:
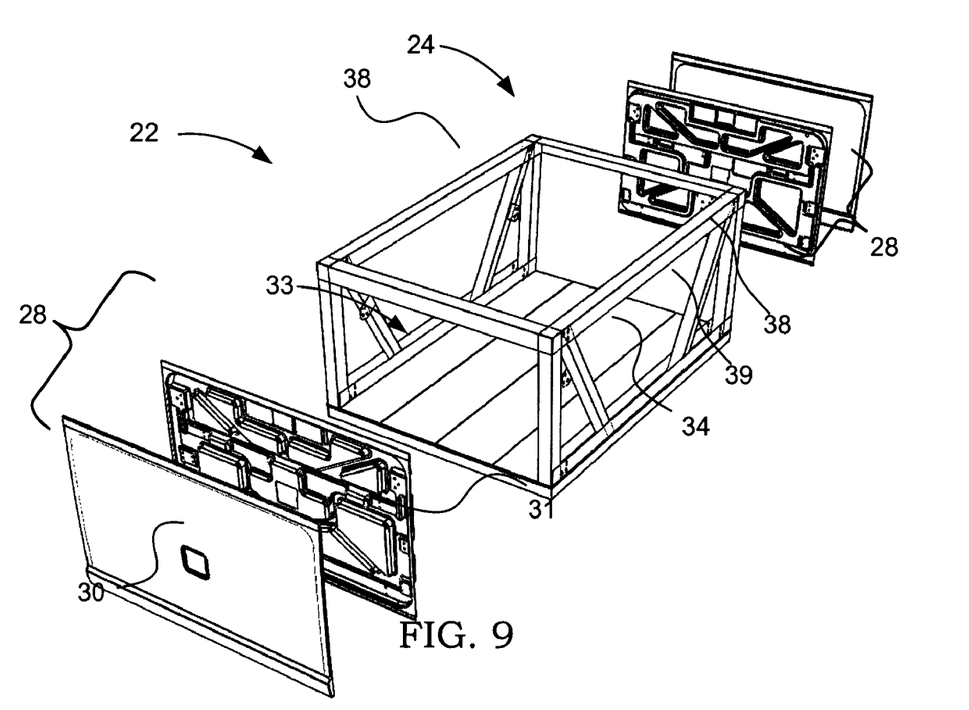
FIG. 9 is a partially exploded perspective view of another exemplary embodiment of an individual baggage compartment.

Referring to FIG. 9, another exemplary embodiment of a compartment 22 is shown and may include two door assemblies 28, a floor assembly 33 formed from a plurality of floor members 34, and reinforcing members 38, 39. The frame structure 24 of an individual compartment 22 may be constructed by joining the reinforcement members 38, 39 and the floor members 34 through conventional coupling methods (e.g., fasteners and/or adhesives) to form a substantially hexahedral shape, as described above. Two door assemblies 28 may be coupled, using conventional coupling methods (e.g., fasteners and/or adhesives), to the frame structure 24 on opposing ends of the individual compartment 22. This embodiment may further include at least one side member 32, which may be coupled using conventional coupling methods (e.g., fasteners and/or adhesives).

Figure 10:
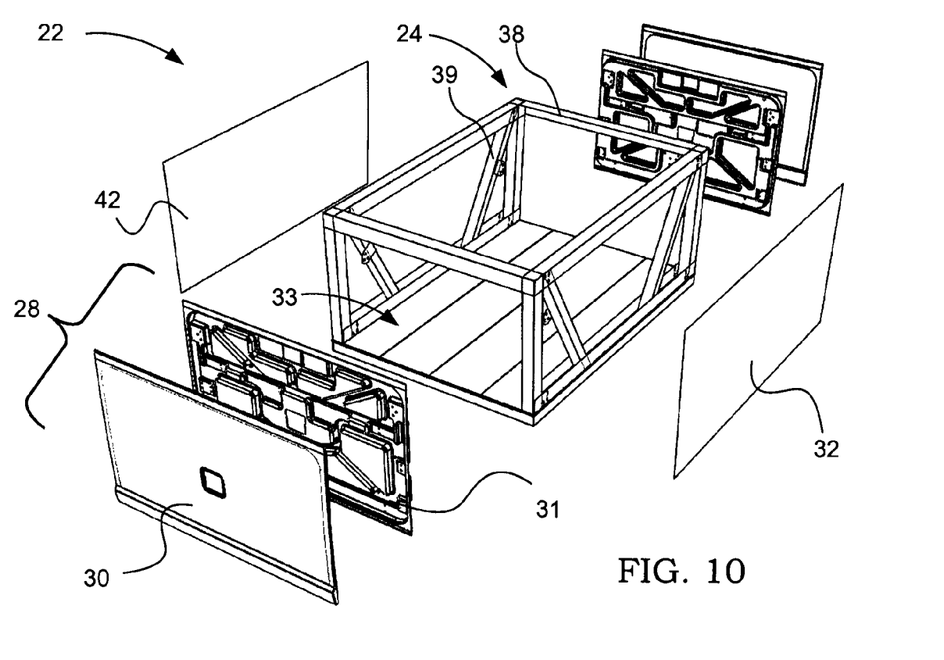
FIG. 10 is a partially exploded perspective view of yet another exemplary embodiment of an individual baggage compartment.
Figure 11:
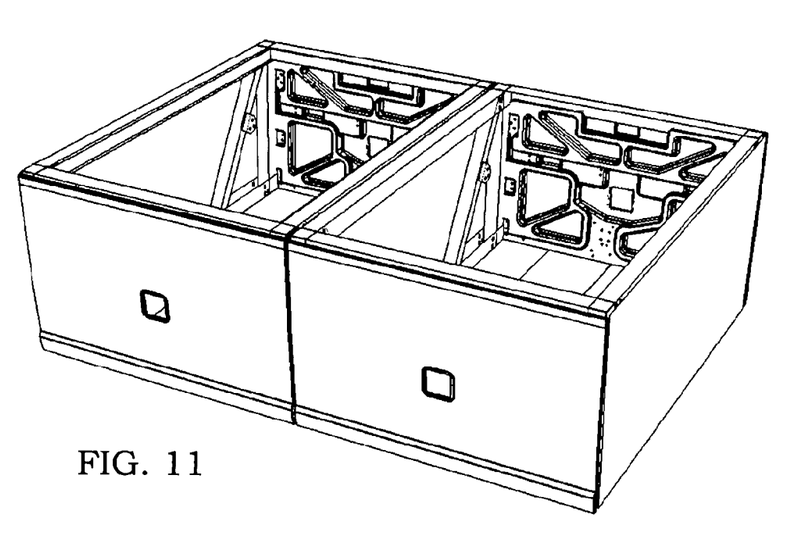
FIG. 11 is an assembly with two adjacent compartments separated by a wall according to an exemplary embodiment.

Referring to FIG. 10, another exemplary embodiment of a compartment 22 is shown and includes two door assemblies 28, a floor assembly 33, a side member or wall 32, reinforcing members 38, 39, and a divider member 42 (e.g., a wall or panel). The frame structure 24 of an individual compartment 22 may be constructed by joining the reinforcement members 38 and the floor assembly 33 through conventional coupling methods (e.g., fasteners and/or adhesives) to form a substantially hexahedral shape, as described above. Two door assemblies 28 may be coupled, using conventional coupling methods (e.g., fasteners and/or adhesives), to the frame structure 24 on opposing ends of the individual compartment 22. The side member 32 may have an inner surface that may be coupled to other members and an outer surface, with the outer surface having a finish tailored to meet customer aesthetic requirements. The side member 32 and the divider member 42 may be coupled, using conventional coupling methods (e.g., fasteners and/or adhesives), to the frame structure 24 on opposing ends of the compartment 22. FIG. 11 shows two compartments such as that shown in FIG. 10 coupled together to form an assembly in which adjacent compartments are separated from each other by walls 32, 42.

As illustrated in the various exemplary embodiments herein, a floor assembly 33 may be provided that includes a plurality of floor members 34 (e.g., panels, sections, planks, etc.). According to an exemplary embodiment, the floor assembly 33 is constructed to be load bearing, providing support to luggage or other materials that could be stored on top of it. According to an exemplary embodiment, each of the floor members 34 may be configured for coupling with an adjacent floor member to form the floor assembly. For example, a portion of each of the floor members 34 may be configured to nest within a portion of an adjacent floor member 34. One exemplary embodiment of such a configuration is shown in FIG. 7, in which a first edge or end 51 of a first floor member 34 is received within a channel formed in a second edge or end 53 of a second floor member 34. Thus, the second edge 53 of the members 34 has a generally C-shaped opening that is configured to receive the opposite edge of the adjacent member 34. Such a configuration is intended to provide a relatively strong assembly that may be relatively easily assembled together. The joint strength between the adjacent floor members 34 may be improved by using an adhesive (e.g., a urethane adhesive), fasteners (e.g., bolt, rivet, screw), or by combination of adhesives and fasteners. According to an exemplary embodiment, one end of the floor assembly 33 having a male coupling may be capped, and the opposite end having a female coupling may be plugged to provide a smooth finish. It should be noted that although shown in FIG. 7 as being solid, the floor members may be hollow according to other exemplary embodiments to further provide for a lightweight floor structure for the compartments.

Figure 12:
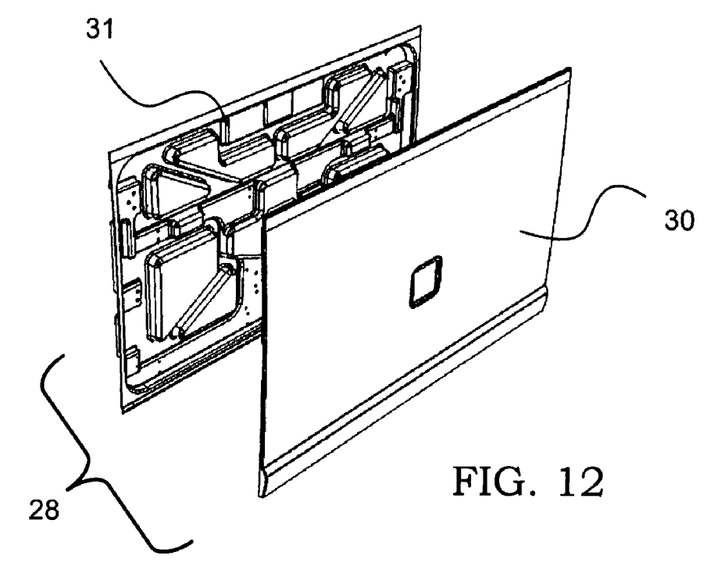
FIG. 12 is an exploded view of an exemplary embodiment of a door assembly for use within a modular baggage compartment assembly.

Referring to FIG. 12, an exemplary embodiment of a door assembly 28 is shown and may include a door fascia 30 and a door support 31. The door fascia 30 may have an aesthetic surface finish to match the other body panels of vehicle 10, and may further include a handle or other structure to facilitate opening of the door assembly 28 to access the compartment. The door support 31 may be configured to provide improved strength to support loading (e.g., luggage loads or knee loads) by having improved sectional properties. Door support 31 may be coupled to door fascia 30 through conventional methods (e.g., fasteners, adhesives, combination). According to an exemplary embodiment, door assembly 28 may be coupled to the compartment 22 through conventional hinge type mechanisms which provide for rotation of the door assembly 28 with respect to the individual compartment 22 (e.g., hinges). According to another embodiment, a handle of the door assembly 28 may include a locking mechanism to provide lockable access to the storage compartment of an individual compartment 22.

According to another embodiment, a compartment 22 may further include a top member (not shown) that may be coupled to the top surface of a backing member 36, to the top surface of a side member 32, to the top surface of a reinforcement member 38, or any combination thereof. The top member may be included to provide additional structural support, to protect the stored luggage, and to reduce noise entering the passenger seating compartment 14 from under the vehicle 10, by dampening sound.

According to another exemplary embodiment, an assembly such as that shown in FIGS. 2, and 4-5 may include four door assemblies 28, two side members 32, a single backing member 36, and a single load bearing floor member 34. This configuration instead of having multiple compartments 22 coupled together to form one modular baggage compartment assembly 20, would have one base structure having four door assemblies 28 each providing access to a unique storage volume. According to other embodiments, the number of door assemblies 28, the size of each unique storage volume, as well as the size of the base structure could vary to meet customer specifications. These configurations may have a single load bearing floor assembly 33 as well as the single backing member 36 that may span the entire length of the compartment and be shared by each unique storage volume. According to other embodiments, several unique storage volumes may share a common door assembly 28. Accordingly, each door assembly 28 may include hinge mechanisms and/or locking or latching mechanisms.

According to an exemplary embodiment, the various components of the assemblies 20, 21 may be formed from a composite material. For example, according to an exemplary embodiment, the floor members, frame members, walls, and door assemblies may be made of a glass or carbon fiber-reinforced resin (e.g., a polyurethane or acrylonitrile-butadiene-styrene (ABS) resin matrix material that includes fiberglass strands, mats, rovings, or the like embedded within the matrix material). According to other exemplary embodiments, a polyester or vinyl ester resin system may be used for the matrix material. Different types of reinforcement materials may also be used. For example, according to an exemplary embodiment, both unidirectional and mat-type and/or chopped fiber reinforcements may be used within a single component. Any suitable polymeric resin and reinforcement material may be used according to various exemplary embodiments. It should also be noted that different components may be made of different materials (e.g., if one component requires more strength than another component, additional or different reinforcement materials and/or matrix materials may be used to provide enhanced strength and/or rigidity). The composite components may be individually manufactured using a pultrusion process according to an exemplary embodiment, although it should be understood that other processes such as extrusion, thermoforming, injection molding, or other suitable processes may be used according to other exemplary embodiments.

One advantageous feature of using composite materials for the various components of the assemblies 20, 21 is that the overall structure of the assemblies will be lighter than if the assemblies were made from materials such as metals. The reinforcement materials that are utilized within the composite materials may provide enhanced strength for the components that are suitable for the demands that will be placed on the assemblies.

According to an exemplary embodiment, the assemblies 20, 21 are configured to fit within a space provided in the vehicle. For example, with respect to the vehicle shown in FIG. 1, an assembly may be placed beneath the vehicle in a space provided between the front and rear wheels. Structural members of the vehicles (e.g., beams or other frame members or elements) may be used to secure the assemblies to the vehicle (e.g., using fasteners, adhesives, or a combination thereof). For example, screws or bolts may be used to secure the upper members of the frames of the compartments to a beam under the vehicle and/or to other structural members of the vehicle.

According to one exemplary embodiment, the assemblies 20, 21 may be preassembled prior to coupling to the vehicle such that adjacent compartments are already coupled together before coupling to the vehicle (the door assemblies may be coupled to the compartments at this time or may be added later after the compartments are coupled to the vehicle). According to another exemplary embodiment, the various compartments may be separately coupled to the vehicle one at a time and then coupled to each other if desired.

One advantageous feature of the assemblies shown and described herein is that the manufacture and assembly of the assemblies may be relatively simple and inexpensive. In addition to the fact that the various components are formed of a lightweight and inexpensive composite polymeric materials, the dimensions of the structures may be altered without the need to purchase separate tooling. For example, if a storage compartment having different dimensions is required, the frame members can be manufactured using the same equipment and cut to length. Similarly, more or fewer floor members (e.g., floor members 34) may be used and/or the floor members may be cut to a different length to provide a floor having a different dimension. Side and rear panels may also be cut to size as desired.

Also, by using separate compartments that each have their own frame structure, an assembly having a greater or lesser number of compartments may be assembled without having to change tooling. In this manner, a manufacturer of the assemblies could offer a few different sizes of compartments that may be put together in an assembly, and the assemblies could be customized for a particular application by mixing and matching the various different compartment sizes to produce an assembly having the desired dimensions. This modularity improves the ability of a manufacturer of the assemblies to respond to customer requirements in a relatively quick and efficient manner, without the need to redesign and purchase new tooling for the majority of the components of the assembly.

As utilized herein, the terms "approximately," "about," "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the modular storage compartment as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A modular storage compartment assembly for a vehicle comprising:
a plurality of storage compartments coupled together and arranged in a side-by-side configuration to form a modular assembly, with each storage compartment comprising a plurality of frame members coupled together to form a frame structure for the storage compartment, a floor assembly comprising a plurality of floor members coupled together,
at least one door configured to allow access to one or more of said plurality of storage compartments;
a door support forming part of said at least one door and providing reinforcement to said at least one door; and
a door fascia of said at least one door, said door fascia connected to said door support;
wherein the plurality of storage compartments are configured for coupling to a vehicle;
wherein the frame members and the floor members are formed of a pultruded composite material that comprises a polymeric resin matrix and fiber reinforcements provided within the matrix.

2. The assembly of claim 1, wherein at least two of the plurality of storage compartments have substantially the same dimensions.

3. The assembly of claim 2, wherein at least one of the plurality of storage compartments has dimensions that differ from the at least two storage compartments having substantially the same dimensions.

4. The assembly of claim 1, wherein the plurality of storage compartments are configured for being positioned between front and rear wheels of a vehicle.

5. The assembly of claim 1, wherein the plurality of storage compartments are configured for access from outside the vehicle.

6. The assembly of claim 1, further comprising at least one panel coupled to said frame structure, the at least one panel formed of a pultruded composite material.

7. The assembly of claim 6, wherein the at least one panel forms an exterior wall of the compartment.

8. The assembly of claim 1, wherein said door fascia provides an exterior aesthetic surface for one of said plurality of storage compartments.

9. The assembly of claim 1, wherein each of the plurality of floor members mate with at least one adjacent floor member, each one of said plurality of floor members further comprising a first edge and a second edge, wherein the first edge of one of said plurality of floor members is configured for receipt within a portion of the second edge of another of said plurality of floor members.

10. The assembly of claim 9, further comprising an adhesive coupling the adjacent floor members together to form the floor assembly.

11. The assembly of claim 1, further comprising a divider provided within at least one of the storage compartments, wherein said divider is in the form of a wall.

12. The assembly of claim 1, wherein at least one of the storage compartments comprises two doors.

13. A modular storage compartment assembly for a vehicle comprising:
a plurality of storage compartments coupled together, wherein each storage compartment comprises a floor assembly comprising a plurality of floor members mateably coupled together and a frame structure comprising multiple members coupled together to form a substantially hexahedral frame structure; and
a plurality of door members, each of said plurality of door members configured to allow access to one or more of said plurality of storage compartments, each of said plurality of door members having a door support, and a door fascia connected to said door support;
wherein the floor members and a first of said plurality of door members are coupled to the frame structure;
wherein the floor members, said first of said plurality of door members, and said frame structure are formed from composite materials that include a polymeric matrix material and at least one reinforcement material embedded in the polymeric matrix material.

14. The assembly of claim 13, wherein the floor members are formed from a first composite material and the frame structure is formed from a second composite material different from the first composite material.

15. The assembly of claim 13, wherein at least one of the plurality of storage compartments comprises two of said plurality of door members, wherein said first of the two of said plurality of door members is provided at a first end of the compartment and a second of the two of said plurality of door members is provided on an opposite second end of the compartment.

16. The assembly of claim 13, further comprising at least one panel coupled to the frame structure and formed of a composite material.

17. The assembly of claim 16, wherein the at least one panel is configured to divide the compartment from an adjacent compartment.

18. The assembly of claim 13, wherein each one of said plurality of floor members further comprises a first edge and a second edge, wherein the first edge of one of said plurality of floor members is configured for receipt within a portion of the second edge of another of said plurality of floor members.

19. The assembly of claim 18, wherein the floor members are coupled together with an adhesive.

20. The assembly of claim 13, wherein the polymeric matrix material is selected from the group consisting of a polyester material, a vinyl ester material, a polyurethane material, an acrylonitrile-butadiene-styrene material, and combinations thereof.

21. The assembly of claim 20, wherein the reinforcement materials are selected from the group consisting of substantially unidirectional fibers, randomly-oriented chopped fibers, fiber mats, and combinations thereof.

22. A storage assembly for a vehicle comprising:
a plurality of storage compartments coupled to a frame of a vehicle between wheels of the vehicle, the storage compartments coupled together and arranged in a side-by-side configuration to form a modular assembly, with each storage compartment comprising a plurality of frame members coupled together to form a frame structure for the storage compartment, a floor assembly comprising a plurality of floor members coupled together
at least one door configured to allow access to one or more of said plurality of storage compartments;
a door support forming part of said at least one door and providing reinforcement to said at least one door; and
a door fascia of said at least one door, said door fascia connected to said door support;
wherein the plurality of storage compartments are configured for coupling to a vehicle; and wherein the frame members and the floor members are formed of a pultruded composite material that comprises a polymeric resin matrix and fiber reinforcements provided within the matrix.

23. The assembly of claim 22, wherein each of said plurality of floor members mate with at least one adjacent floor member, each one of said plurality of floor members further comprising a first edge and a second edge, wherein the first edge of one of said plurality of floor members is configured for receipt within a portion of the second edge of another of said plurality of floor members.

24. The assembly of claim 22, wherein the polymeric matrix material is selected from the group consisting of a polyester material, a vinyl ester material, a polyurethane material, an acrylonitrile-butadiene-styrene material, and combinations thereof.

25. The assembly of claim 24, wherein the fiber reinforcements are selected from the group consisting of substantially unidirectional fibers, randomly-oriented chopped fibers, fiber mats, and combinations thereof.

26. The assembly of claim 22, wherein the vehicle is a bus.

27. The assembly of claim 22, wherein the door is accessible from outside of the vehicle.

* * * * *